United States Patent
Scott et al.

(10) Patent No.: US 9,805,081 B2
(45) Date of Patent: Oct. 31, 2017

(54) RECORD LINKAGE ALGORITHM FOR MULTI-STRUCTURED DATA

(71) Applicant: Zephyr Health, Inc., San Francisco, CA (US)

(72) Inventors: Tony C. Scott, Sunnyvale, CA (US); Cesar Augusto Arevalo Aguilera, San Francisco, CA (US); Aaron A. Chaiclin, San Francisco, CA (US); Sven Christoffer Junkergard, San Anselmo, CA (US)

(73) Assignee: ZEPHYR HEALTH, INC., San Francisco, CA (US)

( * ) Notice: Subject to any disclaimer, the term of this patent is extended or adjusted under 35 U.S.C. 154(b) by 453 days.

(21) Appl. No.: 14/203,205

(22) Filed: Mar. 10, 2014

(65) Prior Publication Data

US 2015/0254308 A1 Sep. 10, 2015

(51) Int. Cl.
 *G06F 7/00* (2006.01)
 *G06F 17/30* (2006.01)
(52) U.S. Cl.
 CPC .. *G06F 17/30345* (2013.01); *G06F 17/30542* (2013.01)
(58) Field of Classification Search
 CPC .......... G06F 17/3048; G06F 17/30477; G06F 17/30542; G06F 17/30634; Y10S 707/99932; Y10S 707/99931; Y10S 707/99933; Y10S 707/99935; Y10S 707/99936; G06Q 30/0269; G06N 5/048; G06N 7/005

USPC .............. 707/726, 800, 780, 796, 758, 688, 707/728–730
See application file for complete search history.

(56) References Cited

U.S. PATENT DOCUMENTS

| | | | | |
|---|---|---|---|---|
| 6,931,418 B1* | 8/2005 | Barnes | ............. | G06F 17/30333 707/600 |
| 2003/0061200 A1* | 3/2003 | Hubert | ............. | G06F 17/30011 |
| 2003/0061201 A1* | 3/2003 | Grefenstette | ..... | G06F 17/30011 |
| 2003/0182281 A1* | 9/2003 | Wittkowski | ............ | G06F 17/18 |
| 2004/0024867 A1* | 2/2004 | Kjellberg | .......... | G06F 17/30905 709/224 |
| 2004/0176958 A1* | 9/2004 | Salmenkaita | ..... | H04M 1/72561 704/275 |
| 2005/0149538 A1* | 7/2005 | Singh | ................ | G06F 17/30893 |
| 2008/0133291 A1* | 6/2008 | Nasser | ................... | G01S 19/09 705/7.34 |
| 2011/0010458 A1* | 1/2011 | Das | ........................ | H04W 48/08 709/227 |
| 2012/0023107 A1* | 1/2012 | Nachnani | .......... | G06F 17/30303 707/748 |
| 2015/0100661 A1* | 4/2015 | Heise | .................... | H04L 47/125 709/213 |

* cited by examiner

*Primary Examiner* — Tony Mahmoudi
*Assistant Examiner* — Linh Black
(74) *Attorney, Agent, or Firm* — K&L Gates LLP

(57) ABSTRACT

A system and method for record linkage includes performing an entity augmentation process for linking new data records with existing entities in a database. Performing the entity augmentation process includes performing an exact matching sub-process that includes accessing existing entity unique identifier (UID) keys in a memory cache layer and comparing a new data record UID key to the existing entity UID keys.

20 Claims, 7 Drawing Sheets

RECORD LINKAGE ALGORITHM FOR MULTI-STRUCTURED DATA

BACKGROUND

The present disclosure relates to database management and more specifically to the application of record linkage in database management.

DESCRIPTION OF THE BACKGROUND OF THE TECHNOLOGY

Managing large amounts of data in dynamic database environments is a complex task that continually challenges data integrity because imported data may create duplicate entities within the database. In general, record linkage is an attempt to combat the duplication issue, however, conventional record linkage algorithms require time consuming computations. What are needed are record linkage algorithms for database management applications for integration and maintenance of multi-structured data in dynamic database environments to improve data integrity and computation efficiency.

SUMMARY

In one aspect, a method for record linkage includes performing an entity augmentation process for linking new data records with existing entities in a database. Performing the entity augmentation process may include performing an exact matching sub-process that includes accessing existing entity unique identifier (UID) keys in a memory cache layer and comparing a new data record UID key to the existing entity UID keys.

In one aspect, a system for performing record linkage comprises a database for storing a plurality of existing entity records and a data management processing system comprising a data import module configured to receive an imported data record. The data import module may comprise an entity augmentation process module for linking new data records with existing entities in a database. The entity augmentation process module may be configured to perform an exact matching sub-process to access existing entity UID keys in a memory cache layer and compare a UID key associated with the imported data record to the existing entity UID keys.

In one embodiment, a method for record linkage comprises performing a fuzzy matching sub-process comprising accessing existing entity block keys in a cache layer. The existing entity block keys may identify blocks of existing entities in the database sharing entity fields. In one embodiment, the method further includes selecting one or more blocks for comparison to a dataset record, for example a new or existing dataset record. The one or more blocks selected may be identified by block keys specifying entity fields matching corresponding fields of the dataset record.

DRAWINGS

The various embodiments of record linkage systems and processes for performing record linkage described herein may be better understood by considering the following description in conjunction with the accompanying drawings.

DETAILED DESCRIPTION OF CERTAIN NON-LIMITING EMBODIMENTS

Importation of new data records into a database comprising many existing entities may challenge data integrity because the new data records may create duplicate entities in the database. Record linkage is a manner of addressing the duplication issue by associating imported records with existing entities, however, conventional record linkage algorithms require time consuming computations and inefficient allocation of system resources. According to various embodiments, the present disclosure comprises a record linkage process that may include entity augmentation and/or entity reduction for multi-structured data in dynamic database environments that provides an innovative solution to the above data integrity issues by reducing duplicate records in the database.

As will be apparent to those having skill in the art, one beneficial aspect of the present disclosure is a proactive record linkage process, e.g., a process comprising one or more algorithms, that may be employed in database management to avoid introducing and/or maintaining duplicate records in a database. For example, the process may proactively attempt to match or link new data records to existing entities in the database when the new records are presented for input or loaded into the database. In addition to the above, the record linkage process may also be employed to quickly and effectively reduce the number of duplicate entities already present in the database.

In one embodiment, a system for performing record linkage comprises a database that houses a plurality of dataset records comprising entities or profiles. According to various embodiments, multi-structured data may be ingested into the database, e.g., in its raw form. Clustering techniques may then be used to group the data into a set of profiles that represent individuals, for example, ensuring that all facts known about each individual is linked to only one profile in the dataset. The record linkage algorithm may internally use both exact matches as well as statistical methods for linking records to specific profiles. In operation, the record linkage algorithm may increase computational efficiency by making use of one or more memory cache layers to save or store exact match keys, block keys of entities, and/or statistics for use in a fuzzy matching algorithm, as explained in more detail below. The record linkage algorithm may include one or both of an entity augmentation process and an entity reduction process. In various embodiments, both the entity augmentation process and the entity reduction process may further comprise one or more sub-processes. Each sub-process may comprise one or more algorithms. In one embodiment, the record linkage process may be used to increase computational efficiency by performing an exact matching sub-process to match those records which may be exact matches with existing entities in the database before performing a fuzzy matching sub-process.

Figure 1:
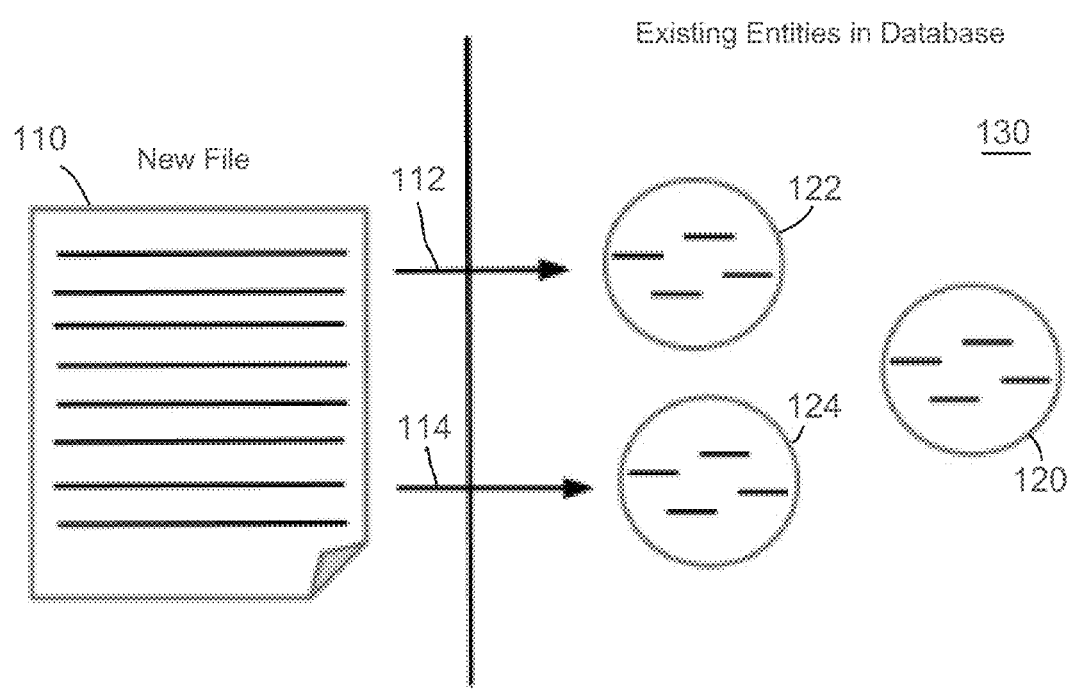
FIG. 1 is a simplified diagram illustrating attachment of new records to existing entities in a database according to certain embodiments described herein.

FIG. 1 is a simplified diagram illustrating a staged dataset (file) 110 comprising two records 112, 114 for attachment to existing entities 122, 124, and 126 (120) in a database 130 according to certain embodiments of an entity augmentation process described herein. The entity augmentation process includes matching new data records 112, 114 from a dataset (file) 110 to existing entities 122, 124, 126 in a database 130, e.g., comparing a new record 112, 114 against a database 130 of records 122, 124, 126. For example, before loading the data into the database 130, the new records 112, 114 may be staged for application of the entity augmentation process. Depending on the particular application, staging may be part of or separate from the entity augmentation process. The entity augmentation process attempts to link the new records 112, 114 to existing entity records 122, 124, 126 in the database 130. For example, the entity augmentation process may compare attributes or identifiers of the new data records 112, 114 to corresponding attributes or identifiers of the existing entities 122, 124, 126 in the database 130 to attempt to match the new data records 112, 114 to existing entities 122, 124, 126. In FIG. 1, a first data record 112 has been determined to match a first existing entity 122 and a second data record 114 has also been determined to match a second existing entity 124. Accordingly, the records 112, 114 determined to match the existing entities 122, 124 may be linked or otherwise noted as matched for further review, for example, in the database 130.

As described in more detail below, according to various embodiments, the entity augmentation process may include one or both of an exact matching sub-process and a fuzzy matching sub-process. The exact matching sub-process may be utilized to identify new data records comprising unique identifiers (UIDs) determined to be exact matches to existing entities in the database. In one embodiment, the fuzzy matching sub-process comprises finding associations between new data records and existing data records. In some embodiments, the fuzzy matching sub-process may be a decision tree based process. For example, the fuzzy matching sub-process may use a decision tree based process using ranging from direct and fast string matching, intermediate steps for special processing such as variations in data type, format, or expression, for example dates, abbreviations, or initials, and, at the bottom of the decision tree fuzzy, fuzzy matching using one or more combinations of string metrics. According to one embodiment, the fuzzy matching sub-process further includes a probabilistic record linkage method to determine linkage outcomes.

In one embodiment, the exact matching sub-process may be performed before the fuzzy matching sub-process. For example, the exact matches sub-process may run faster than the fuzzy matching sub-process. In one embodiment, when a new data record is determined to be an exact match, the entity augmentation process stops and the system does not run the record through the fuzzy matching sub-process, thus reserving system resources for other processes. Accordingly, the entity augmentation process may provide a very fast and efficient manner of attaching new records to existing entities.

Figure 2:
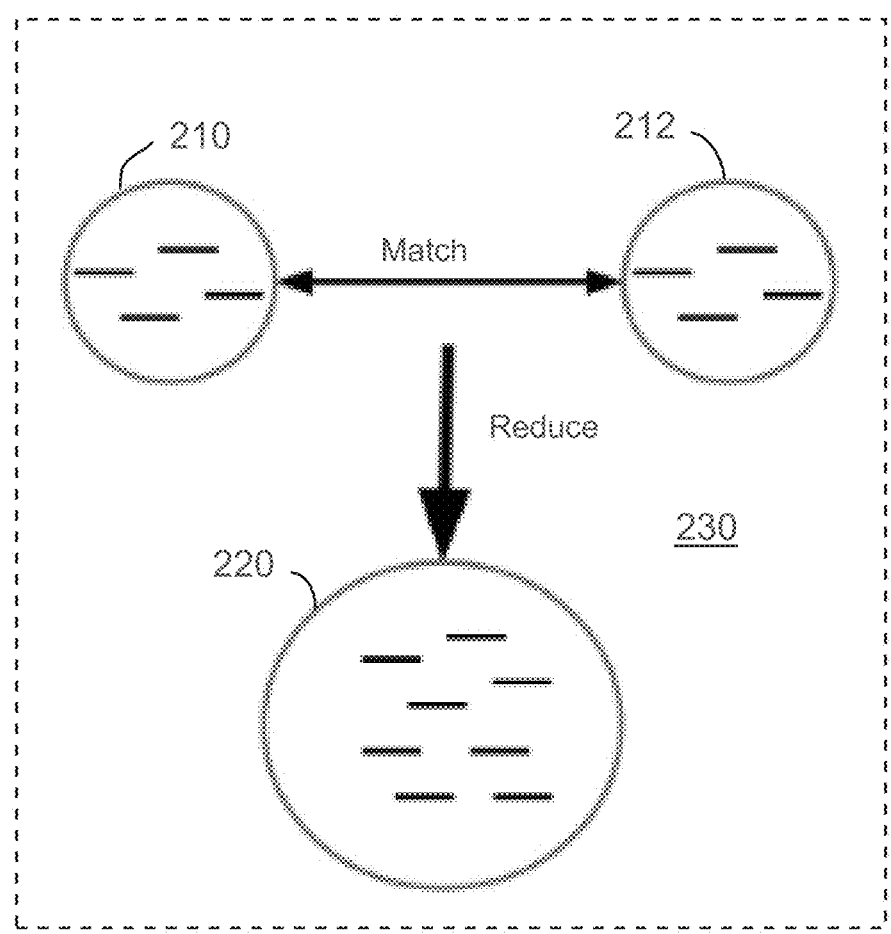
FIG. 2 is a simplified diagram illustrating reduction of two duplicate entities to a single entity according to certain embodiments described herein.

FIG. 2 is a simplified diagram illustrating reduction of two duplicate entities 210, 211 (212) into a single entity 220 according to certain embodiments of an entity reduction process described herein. The entity reduction process generally comprises matching dataset records of existing entities 210, 212 in a database 230. According to various embodiments, the entity reduction process may be utilized to reduce duplicate entities 210, 212 into a single entity 220. For example, the effect of entity reduction may be viewed as removal of one of the duplicate entities 210, 212 (but without removal of the data).

In various embodiments, one or more of the above processes and sub-process or aspects thereof may live in memory. For example, in one embodiment, the exact matching sub-process may include defined UIDs associated with existing entities in the database which may be stored as UID keys in memory cache, e.g., in a cache layer, for efficient access. UIDs associated with corresponding entity attributes, e.g., corresponding fields, of the new records may be quickly compared to the UID keys for efficient linkage. As an additional example, explained in more detail below, the fuzzy matching sub-process may include defined block keys associated with existing entity fields. The block keys may be saved or stored in a cache layer for quick and efficient access. For example, new or existing dataset record fields corresponding to the block keys may be compared to the block keys to refine the set of potential existing entities to which the records are to be compared. Thus, according to various embodiments, a cache layer may be utilized to limit or avoid time consuming hard disk lookups and I/O operations.

Figure 3:
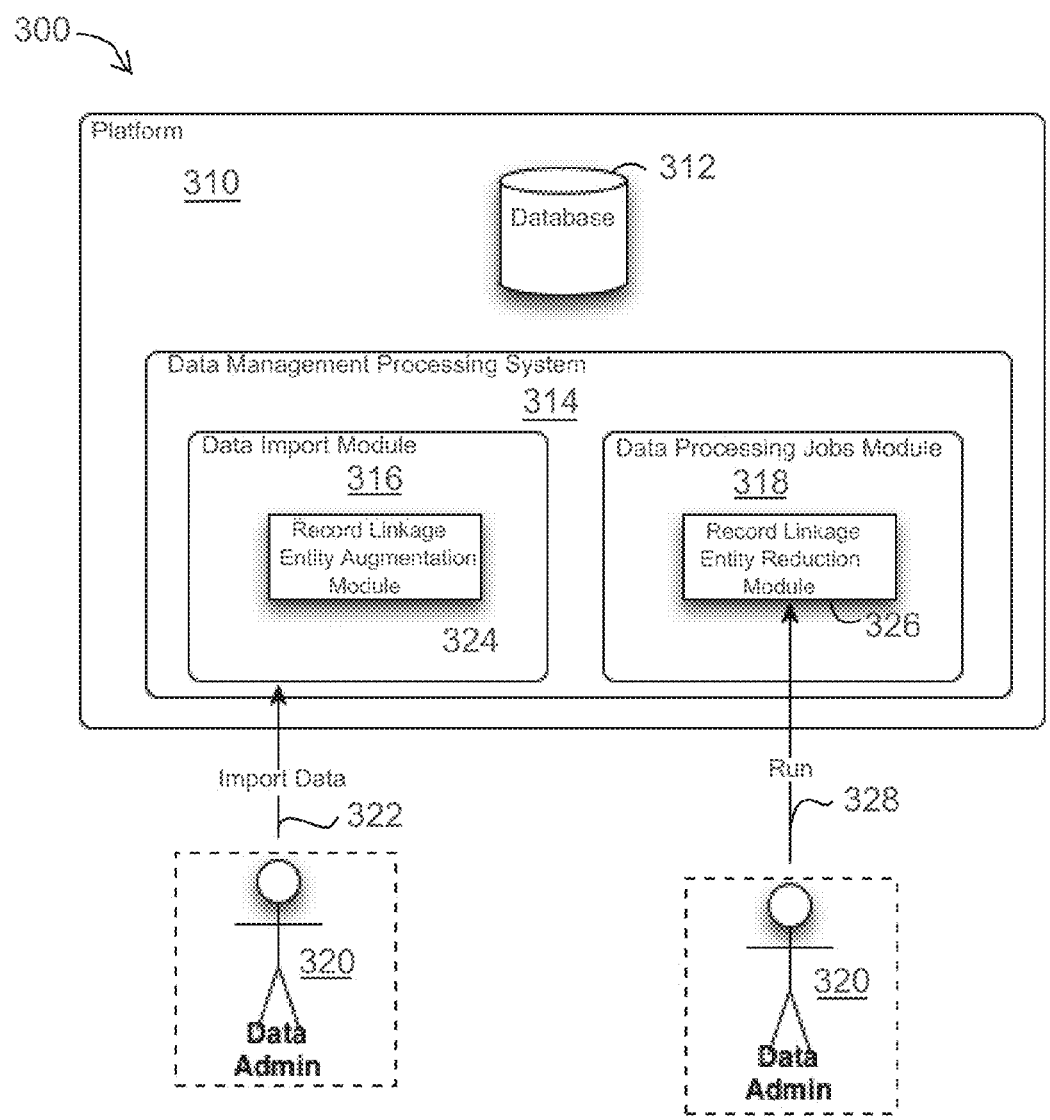
FIG. 3 is a simplified diagram showing various components of a record linkage system architecture according to certain embodiments described herein.

FIG. 3 is a simplified diagram showing various components of a system architecture incorporating a computer implemented record linkage algorithm according to certain embodiments described herein. The system 300 includes an operation platform 310 comprising a database 312. A data management processing system (DMP) 314 operatively interfaces with the database 312 and includes a data import workflow module 316 and a data processing jobs module 318. In one embodiment, a data administrator 320 may present data for import 322 to the DMP 314. It is to be understood that while the simplified diagram shows the data administrator 320 to be a person, in certain embodiments, the data administrator may include software configured to present data for import and need not require human intervention to perform all administrative tasks. For example, the data administrator 320 may comprise a computer implemented program configured to collect, receive, or otherwise obtain new data and present the new data for import to the data import module 316. The data import module 316 includes a record linkage entity augmentation module 324 configured to link the import data 322 to existing entities in the database 312. The DMP 314 may be configured run the import data 322 through an entity augmentation process via the record linkage entity augmentation module 324, which may include one or both of an exact matching sub-process and a fuzzy matching sub-process. In one embodiment, the data administrator 320 may interface with the DMP 314 to perform data processing jobs via the data processing jobs module 318. For example, the data administrator 320 may initiate, e.g., instruct, the record linkage entity reduction module 326 to run 328 an entity reduction process. The entity reduction process generally comprises matching data among existing entities in the database 312 and may be utilized to reduce duplicate entities into a single entity as generally shown in FIG. 2. For example, in one embodiment, the data administrator 320 includes a program configured to instruct the record linkage entity reduction module 326 to run 328 an entity reduction process at scheduled intervals or upon an indication or determination that data integrity may or should be improved with an entity reduction process.

As introduced above, the entity augmentation process may be configured to link new data records to existing entities and may include an exact matching sub-process. According to various embodiments, the exact matching sub-process may include selecting entity attributes for use as unique identifiers. Depending on the application, each entity may have one or more potential entity attributes or fields that may be used as a UID. For example, in one embodiment, entity attributes such as an identification number may be defined in the system as an exact match attribute which may be used by the sub-process as a UID. It is to be understood that the entity attributes used as unique identifiers may vary depending on the underlying data but the entity attribute should be capable of uniquely identifying the entity or possibly a group of entities depending on the design. For example, data records describing facts associated with health care providers may be linked in a database according to the health care providers they describe. As such, an entity attribute may include a national provider identifier (NPI), which the system may define as an exact match attribute. As an additional example, the above database or another database may include data records that describe physicians, in which case exact match attributes may include medical education (ME) number. Other examples of exact match attributes include other various standardized numbering and/or identification systems such as social security numbers and international standard book numbers and the like. Thus, in certain embodiments, the exact match entity attributes selected for use as UIDs may beneficially be modeled in consideration of the underlying data in the database and the entities in which the data describe. Notably, it is to be appreciated that, unless stated otherwise, the present disclosure is not limited by the entity attributes selected for use as exact match attributes or UIDs.

Figure 4:
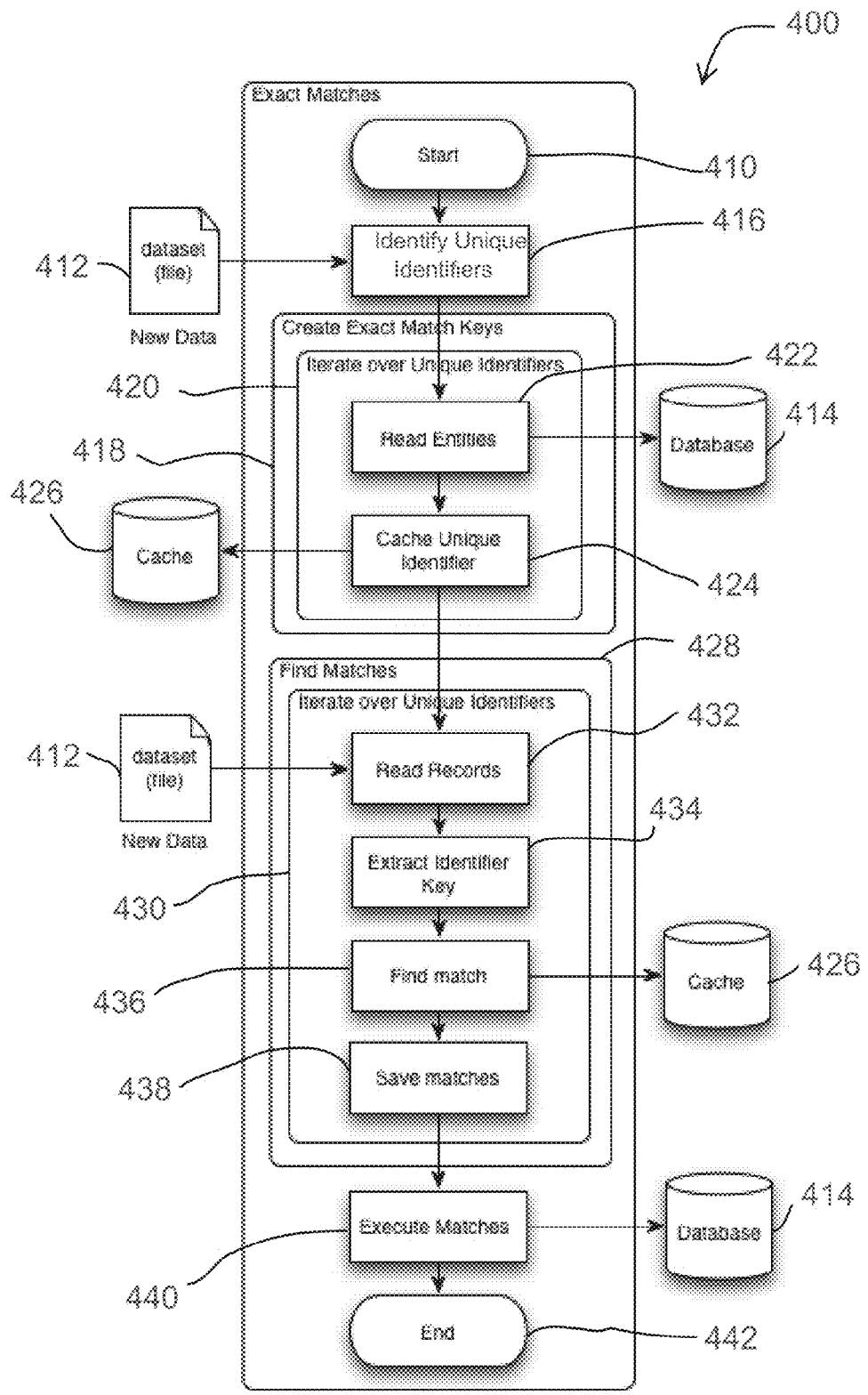
FIG. 4 is a flowchart illustrating certain aspects of an exact matching sub-process of an entity augmentation process according to certain embodiments described herein.

FIG. 4 is a flowchart illustrating certain aspects of an exact matching sub-process 400 of an entity augmentation process according to certain embodiments described herein. In various embodiments, the exact matching sub-process 400 may begin 410 with staging of a new dataset (file) 412 comprising one or more new data records for processing through the exact matching sub-process 400 and ingestion into the database 414. In one embodiment, staging may include identifying data fields 416 in the new data record for use as a UID to link the new data record to one of a plurality of entity profiles. For example, the database 414 may include a plurality of entity profiles and the dataset (file) 412 may include the new data record to be loaded into the database 414 and linked to an entity profile.

According to various embodiments, the exact matches sub-process may further include creating exact match keys 418. The exact match keys may correspond to exact match attributes of existing entities to be used as UIDs. In one embodiment, a client entity may provide one or more particular unique attributes or data fields that may be used as a UID, e.g., internal client numbers. As will be apparent to those having skill in the art upon reading the present disclosure, many variations of the general process may beneficially increase operational efficiency of the system. For example, when a new data record is staged for ingestion into the database, the system may attempt to identify exact match attributes associated with one or more data fields 416 for use as a UID. In various embodiments, the system includes one or more exact match attributes that may be used as UIDs. According to one embodiment, the system uses the exact match attribute identified in the new data record to create or select one or more existing entity exact match UID keys 418 that correspond to the exact match attribute identified. For example, the system may iterate over the existing entities 420, 422 in the database 414 to create exact match keys 418 from exact match attributes of existing entities that correspond to the exact match attribute that was identified 416 in the new data record. According to certain embodiments, the exact match keys may be cached 424 in a memory cache layer 426 for selection and reuse in subsequent matching processes. In one embodiment, the cache layer 426 may store one or more defined sets of exact match keys for quick access when needed. For example, the system may define one or more exact match attributes that may be used as UIDs and may store corresponding exact match keys 418 in the cache layer 426. As such, the system may attempt to identify one or more of the defined exact match attributes 416 in the new record data that may be compared to the cached exact match keys 424. Thus, in one embodiment, the exact matching sub-process 400 includes identifying exact match attributes in the new data records to use as new record UIDs keys 418, selecting corresponding exact match UID keys stored in the cache layer 426, and extracting the new record UID keys for comparison to the exact match UID keys 434.

In various embodiments, still referring to FIG. 4, the exact matching sub-process 400 further includes finding matches 428. In one embodiment, finding matches 428 may include iterating over the new records 430 in the dataset 412, e.g., read new data records 432, extract a new record UID key 434, and accessing the cache 426 to find an exact match key that matches the extracted new record UID key 436. For example, the exact matching sub-process 400 may attempt to match the new data 412 against the previously cached existing entity UIDs in a very fast and efficient process that may quickly match the new records to an existing entity profile. It will be appreciated that, in various embodiments, the new data records of the dataset 412 may not be initially staged for identification of represented data fields 416 for creation or selection of a specific set of exact match UID keys 418 in the cache memory 426, as illustrated in FIG. 4, rather staging may include identifying 416 one or more exact match attributes defined in the system and extracting a corresponding new record UID key 434 for comparison to all or a predetermined set of exact match UID keys 436 stored in the cache 426. In various embodiments, a new data record returned as a match may be saved 438 or otherwise retained for further analysis or other subsequent action, e.g., for inclusion in a subsequent batch execution process 440 of matches, or may be systematically linked to the matching entity profile by an execution process 440 following a match determination 436.

In various embodiments, the entity augmentation process comprises a fuzzy matching sub-process. The fuzzy matching sub-process may generally try to find associations through the use of matching algorithms for records that may or not be determined to be exact matches. For example, one matching algorithm may include a string matching algorithm for names. As described in more detail below, in various embodiments, the fuzzy matching sub-process may utilize block keys saved in a memory cache layer. Thus, block keys that live in memory may be available for quick access to reduce computation time and lookup time. In addition to block keys that live in memory, in certain embodiments, the fuzzy matching sub-processes may also include cached statistics generated from the source database.

Figure 5:
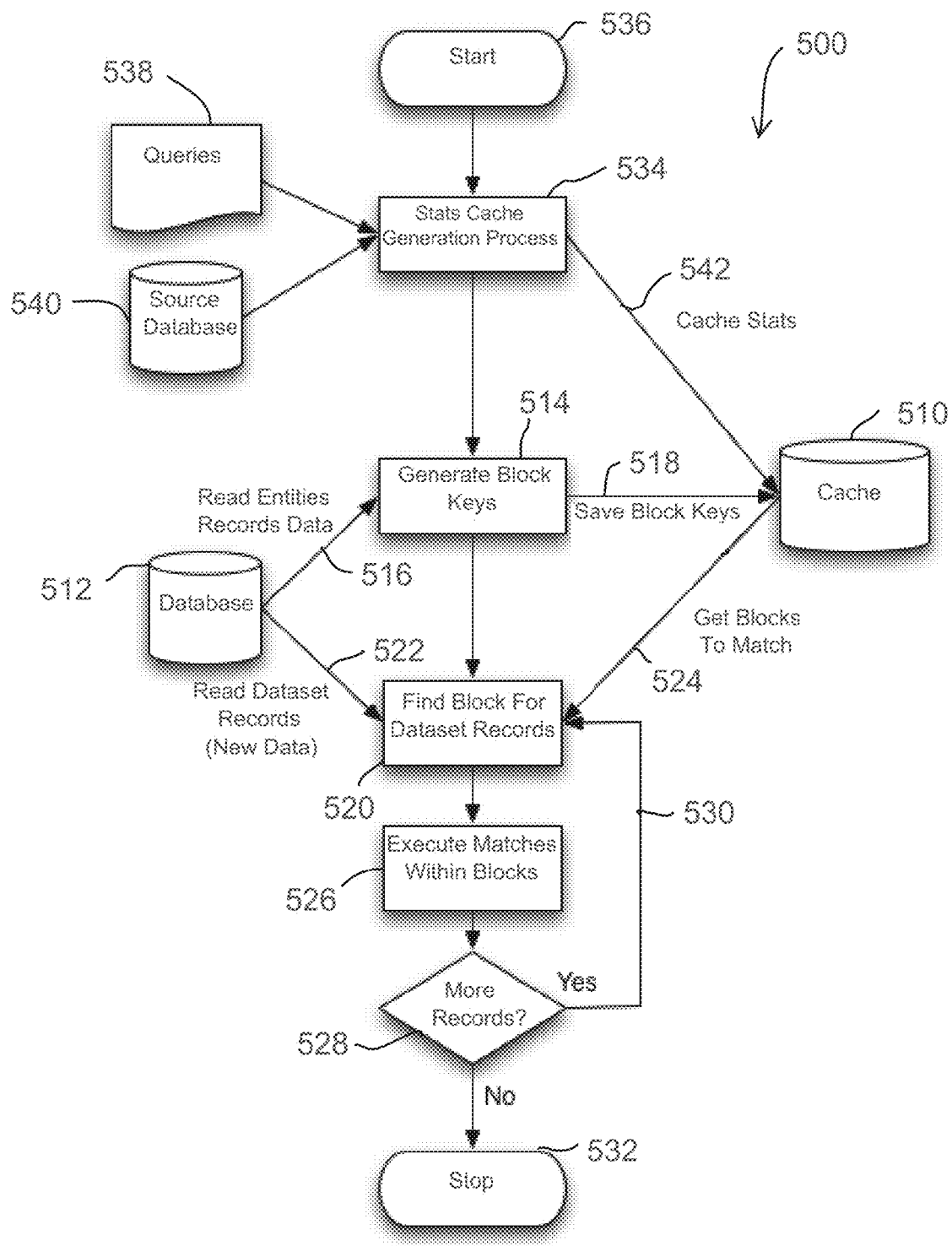
FIG. 5 is a flowchart illustrating certain aspects of a fuzzy matching sub-process of an entity augmentation process according to certain embodiments described herein.

FIG. 5 is a flowchart illustrating certain aspects of a fuzzy matching sub-process 500 of an entity augmentation process according to certain embodiments described herein. According to various embodiments, the fuzzy matching sub-process 500 comprises block keys stored in memory, such as in a cache layer 510, which, in various embodiments, may comprise a mem-cache memory caching system, for example. In general, block keys may refer to one or a set of fields (or subset of data in the fields, for example, first letter of a name or string) used to identify a partition within a database 512. In certain embodiments, the fuzzy matching sub-process uses block keys to identify or reduce a population of existing entities against which a dataset record is to be compared. For example, a block key generation process 514 may comprise reading existing entity data records 516 and generating block keys identifying portions of an existing entity population that share particular field data. In various embodiments, the system may include multiple sets of blocking keys specifying particular entity fields and combinations of entity fields associated with existing entities in the database. As an example, a system may define a block key for "city". A system may also define a block key for multiple entity fields, e.g., "city" "state". In certain embodiments, the system may further define multiple block keys or sets of block keys comprising various combination of entity fields, for example, "city" "state"; "last name" "city" "state"; and "first name" "last name" "city" "state". It is to be appreciated, however, that the above examples are merely examples of entity fields and combinations of entity fields that may be used as block keys and sets of block keys. In practice, the choice of block keys may be determined, for example, with consideration of the underlying data, which may include factors such as the ability of the block key to effectively differentiate or reduce the population of existing entities against which a dataset record is to be compared. That is, block keys reduce the number of time consuming entity comparisons and because the blocking keys are cached 518 for efficient access, lookups are much faster compared to database lookup operations. Thus, utilizing block keys that live in memory may beneficially decrease processing time.

In various embodiments, a fuzzy matching sub-process 500 may also include finding blocks for dataset records 520 comprising one or more records to be compared to the existing entity records in the database 512. For example, finding blocks for the dataset records 520 may comprise reading dataset records data 522, identifying field data in the records corresponding to the block keys saved 518 in the cache layer 510, and accessing the cache layer 510 to get matching blocks 524. Thus, the fuzzy matching sub-process may comprise selecting a reduced population of potential matching entities to only those entities identified by a block key corresponding to identifying field data of the dataset records. Thus, the dataset records could be considered to share the same block key as the block of the existing entities. As an example, a dataset record having city and state fields of "Boston" and "Massachusetts," respectively, may match a block key comprising "BOSTON" "MASSACHUSETTS". Thus, the system will compare the dataset record to a block of existing entities identified by the matching block key. In one embodiment, the data structure of the block keys may comprise a dictionary. For example, the key may comprise the block key: "BOSTON", and the value may comprise entity IDs: 3, 4, 8, which share the block key.

In various embodiments, the fuzzy matching sub-process 500 includes executing matches within the blocks 526. For example, in one embodiment, dataset record identifier fields are compared to corresponding identifier fields of existing entities in the block to determine field matches, as described below. In some embodiments, field comparisons between two potential matching records may comprise generating an output including a quantified probability or a potential outcome determination, e.g., match, no match, possible match. According to certain embodiments, following execution of matches within the blocks 526, the fuzzy matching sub-process 500 may attempt to address additional records 528, if needed 530, and repeat or stop 532 if additional processing is not required.

In certain embodiments, the fuzzy matching sub-process 500 comprises a statistics cache generation process 534. According to various embodiments, the system may begin 536 the fuzzy-matching sub-process 500 by querying 538 a source database 540, e.g., a database from which the new dataset or information regarding the dataset fields is sourced. For example, a statistics cache generation process 534 of a fuzzy matching sub-process 500 for dataset records comprising physician data fields may include importing query data from a source database 540 comprising the National Provider Identification (NPI) Registry database and caching the statistics 542 in the cache layer 518 for quick access in subsequent steps of the fuzzy matching sub-process, as described in more detail below.

According to various embodiments, execution of matches within blocks 526 may take into account multiple fields, e.g., identifier fields, which may be associated with data, entity, or record attributes, for example. Identifier fields may include, for example, fields comprising geographic or demographic data such as one or more of first, middle and last names, street address, city, state, ZIP code, county, country, longitude and latitude, telephone number, date of birth, gender, language, email address, institution, occupation, specialty, education, associations, or any other suitable identifier field. As introduced above, executing matches within blocks 526 may include comparing corresponding identifier fields of the dataset record and an existing entity, which may include determination of a field match and/or score. For example, comparing corresponding identifier fields may comprise comparing the strings for each of the corresponding identifier fields in order to make a determination of match or non-match, calculating a fuzzy match score, and subsequently calculating an overall fuzzy match score that may be used to determine if the records describe the same entity. As explained in more detail below, according to various embodiments, any of the above steps may further comprise accessing cached statistics generated in the stats cache generation process 534.

As described above, identifier field data of dataset records may be compared against identifier field data of blocks of existing entities sharing specified field data identified by the block key. According to various embodiments, the fuzzy matching sub-process 500 includes a fuzzy matching algorithm for comparing data set records to blocks. In one embodiment, the fuzzy matching algorithm comprises a decision tree using ranging from direct and fast string matching, intermediate steps for special processing such as, e.g., initials or abbreviations for identifier field data, such as first and middle names, and at the bottom of the decision tree, application of one or more string metrics. In some instances, the field data may be edited for consistency in format, or otherwise "cleaned" to remove typographical and/or parsing errors in order to facilitate and improve string matching. These modifications may include putting all characters in upper or lower case, replacing accented characters, removing punctuation and extraneous spacing, and/or removing non-alpha-numeric characters. In some instances field data may be standardized against known lists. This includes replacing nicknames with full names, replacing street, state, country and/or other locality names (blvd, ave, ste, etc) and/or abbreviations with standardized names and/or abbreviations. According to certain embodiments, the fuzzy matching algorithm comprises a hybrid algorithm for fuzzy string field matches including phonetic and character matching aspects. For example, in one embodiment, corresponding identifier fields of two records may be compared for a direct match. If the identifier fields are a direct match, the fields may be determined to be a match and a score may be assigned representing the matched field, as described below. If the identifier fields are not a direct match, the fuzzy matching algorithm may perform special processing steps, in order to determine if the identifier fields comprise acceptable variations of matching data, for example, such an abbreviation or initial. As stated above, the fuzzy matching algorithm may further include one or more string metrics or combinations thereof adapted to compare identifier field data. For example, in one embodiment, the fuzzy matching algorithm may include calculation of a Jaro-Winkler distance. Winkler, W. E. (1990) *String Comparator Metrics and Enhanced Decision Rules in the Fellegi-Sunter Model of Record Linkage*, Proceedings of the Section on Survey Research Methods, American Statistical Association, pp. 354-359, the contents of which is herein incorporated by reference in its entirety. Briefly, the higher the Jaro-Winkler distance for two strings, the more similar the strings. For example, in one embodiment, the score may be normalized such that 0 equates to no similarity and 1 is an exact match.

In various embodiments, the fuzzy matching algorithm includes a language-specific phonetic algorithm. For example, identifier field data in English may be run through a phonetic algorithm such as the NYSIIS algorithm (Taft, R. L. (1970) *Name Search Techniques*, Albany, N.Y.: New York State Identification and Intelligence System, the contents of which is herein incorporated by reference in its entirety) or the Soundex algorithm to carry out such tasks as bringing together commonly confused letter groups like "ch" and "gh" or "sh" and "sch" as well as removing vowels. In one embodiment, for example, surnames may be subsequently Soundexed to give the same code to similar sounding non-initial constants. The resulting compression and Soundex codes may be assigned different weights for agreement depending upon their frequency in the population. In various embodiments, other phonetic algorithms may be employed such as the Metaphone or Double Metaphone algorithms (Philips, Lawrence (1990) *Hanging on the Metaphone*, Computer Language, Vol. 7, No. 12, pp. 39-43 and Philips, Lawrence (2000) *The double metaphone search algorithm*, C/C++ Users Journal, Vol. 18, No. 6, pp. 38-43, respectively, the contents of which are herein incorporated by reference in their entirety). Other language specific algorithms may be used, specifically the Kolner Phonetik or the Daitch-Mokotoff Soundex for German, SoundexFrancais for French, or Soundex-Esp for Spanish.

In various embodiments, the fuzzy matching algorithm may include a sequence alignment algorithm such as the Smith-Waterman algorithm (Smith, Temple F.; and Waterman, Michael S. (1981) *Identification of Common Molecular Subsequences*, Journal of Molecular Biology 147: 195-197, the contents of which is herein incorporated by reference in its entirety). Briefly, a sequence alignment algorithm, such as a local sequence alignment algorithm, which may be similar to sequence alignment algorithms useful in bioinformatics applications, for example, may be used to compare character strings of identifier fields. According to various embodiments, the Smith-Waterman algorithm may be useful in the case of, e.g., nicknames and also "wildcard" matching.

As described above, the corresponding identifier fields between two potentially matched records may be individually compared for determination of a match, non-match or possible match. The determination of particular match and non-match thresholds for each identifier field may comprise comparing corresponding identifier field strings using one or more string matching or metrics, as described above. Thresholds for the string metrics may be pre-determined and/or dynamic. For example, the thresholds for determining if a specific identifier field is a match or non-match may be determined by training data and may include consideration of cached statistics. In various embodiments, various fields may include their own dedicated code, e.g., a 5-digit zip code may be assessed by numerical differences rather than string matching, for example.

As introduced above, individual identifier field scores may be combined to arrive at an overall fuzzy match score. In various embodiments, the overall fuzzy match score may be comparable to a threshold score to obtain an outcome decision. In one embodiment, the identifier field scores may be obtained by making threshold determinations of match and non-match for each field, as described above, and then using a probabilistic linkage determination to calculate a weighted fuzzy match score for each identifier field and an overall fuzzy match score for the comparison. For example, in one embodiment, the Fellegi-Sunter method for Probabilistic Record Linkage may be used to assign match and non-match weights for each field (Fellegi, I. P., and Sunter, A. B. (1969), *A Theory for Record Linkage*, Journal of the American Statistical Association, 40, 1183-1210; and generally reviewed at Winkler, W. E. (2006), *Overview of Record Linkage and Current Research Directions*, U.S. Bureau of the Census, Statistical Research Division Report http://www.census.gov/srd/papers/pdf/rrs2006-02.pdf, the contents of which are herein incorporated by reference in their entirety). Briefly, Fellegi-Sunter method may be used to calculate two types of likelihood-ratios: the ratio of the m-probability, the probability of a positive or negative link between two given identifier fields, and the u-probability, the probability that the match was accidental. The probabilities are calculated on a logarithmic scale yielding log-likelihoods, denoted as Binit. A score is obtained by subtracting the u-binits from the m-binits for each identifier field. The scores for each identifier field are summed to calculate an overall fuzzy match score. Thresholds for positive and negative matches may be determined by training data. The statistics for the u-binits may be obtained, for example, from the source database, for example in the statistics cache generation process 526, for efficient access to statistics and tables. When a suitable source database for calculating the u-statistic is not available, for example in the case of international records, the score may be obtained from the m-binits alone. In one aspect of the fuzzy matching subprocess 500, the system accesses the cached statistics 510 for the u-binits statistics as rapidly as possible. Special considerations like, e.g., nicknames may be handled by tables in a similar way as the statistics from the u-binits.

An illustrative example of an application of a Fellegi-Sunter method is shown in Table 1 for two records presenting the following identifying information:

Male John Smith born 15 May 1932
Male J Smith born 5 May 1932

The fuzzy matching algorithm considers all the above identifier fields: sex, first initial, surname, day of birth, month of birth, year of birth using the decision tree described above to determine match and non-match for each field. Table 1 illustrates application of the Fellegi-Sunter method to calculate the odds associated with identifier field comparisons, which may be used to calculate the weighted fuzzy match scores and the overall fuzzy match score, as described above.

TABLE 1

| Identifier Field | m/u (%) | m/u Ratio | Binit |
|---|---|---|---|
| Sex | | | |
| Agreement: odds ratio | 99.5%/50% = | 1.99 | +0.99 |
| First initial | | | |
| Agreement: odds ratio | 97%/12.5% = | 7.76 | +2.96 |
| Surname | | | |
| Agreement: odds ratio | 97%/0.8% = | 121.25 | +6.92 |
| Day of birth | | | |
| Agreement: odds ratio | 3%/92% = | 0.0326 | −4.94 |
| Month of birth | | | |
| Agreement: odds ratio | 97%/8.3% = | 11.7 | +3.55 |
| Year of birth | | | |
| Agreement: odds ratio | 97%/1.4% = | 70.0 | +6.13 |

Note:
The true u-statistics and the true probabilities may be determined from the statistics governing the source database.

As introduced above, in one embodiment, an overall fuzzy match score may be calculated to obtain a potential outcome from a comparison of multiple corresponding identifier fields of two potentially matched records. For example, a "match" outcome may mean that the system determined that two potentially matched records are matched while a "non-match" outcome may mean that the system rejected the match. In one embodiment, a "potential match" outcome may mean the system was not sure if a match was good, and, therefore, was not able to determine whether to reject or accept the match. In one embodiment, a "no decision" outcome may mean the system did not have enough information to make any other match decision. In any of the above potential outcomes, the match may be saved for subsequent review. For example, saved matches may be manually reviewed to determine if the two records will be ultimately linked in the database 512. In one embodiment, a "potential match" outcome may indicate additional review is needed, while a "match" outcome or "non-match" outcome may indicate a lesser extent of review is needed. In some instances the system may systematically accept the records as being a match. However, the system may not necessarily automatically execute the linkage, despite a determination of a match. Thus, as described above, such outcomes may still be subject to further review, such as manual review or other additional analysis, but may not need to be subject to extensive review.

According to various embodiments, a system for performing record linkage includes an entity reduction process. The entity reduction process may be implemented by itself or as part of a system also comprising the entity augmentation process, as described above. The entity reduction process generally works by comparing entity records already existing in the database. For example, the entity reduction process may be used to reduce duplicate entities within the database, as generally shown in FIG. 2, to maintain data integrity.

Figure 6:
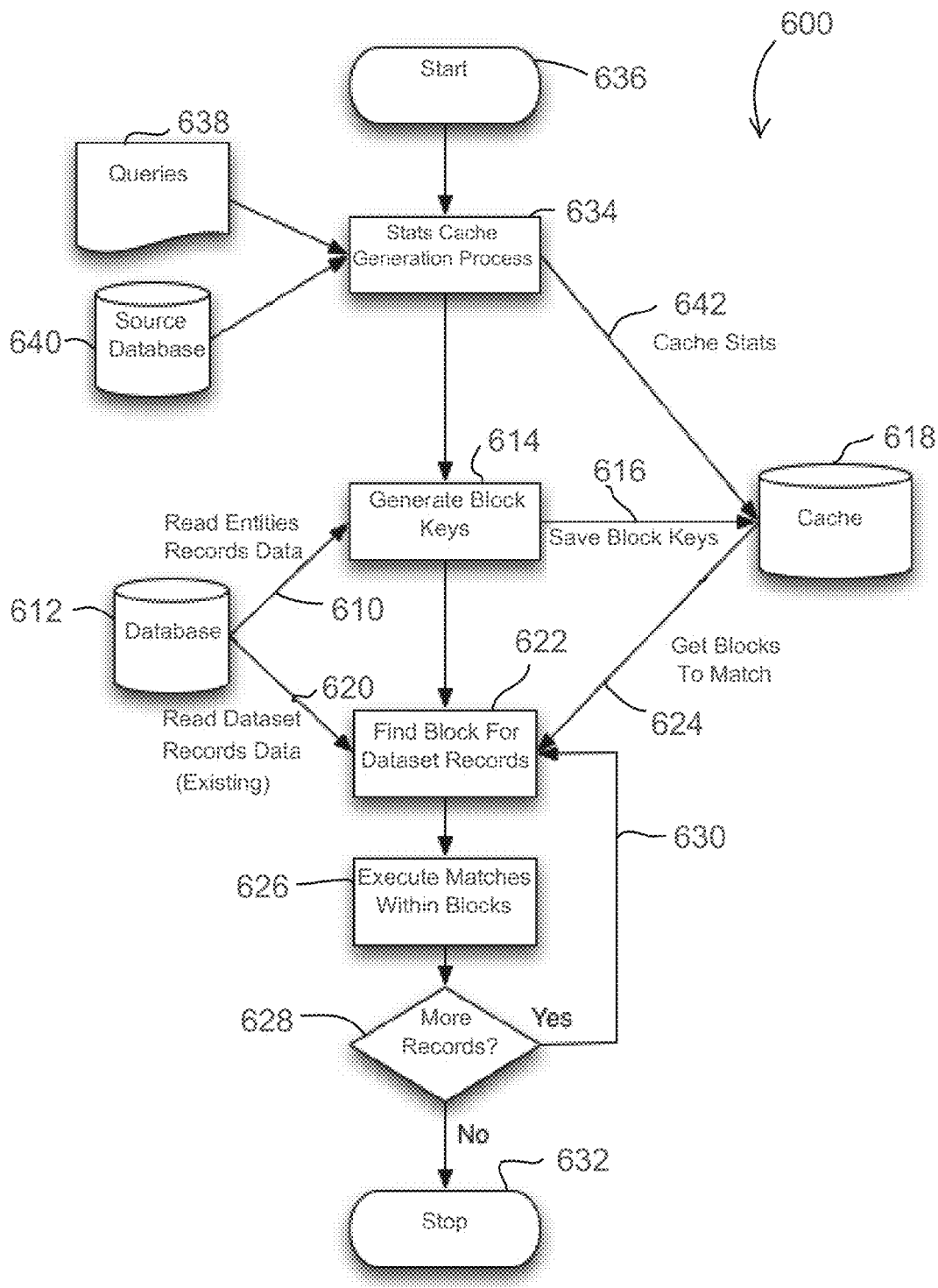
FIG. 6 is a flowchart illustrating certain aspects of a fuzzy matching sub-process of an entity reduction process according to certain embodiments described herein.

FIG. 6 is a flowchart illustrating certain aspects of a fuzzy matching sub-process 600 of an entity reduction process according to certain embodiments described herein. In some respects, the fuzzy matching sub-process 600 of the entity reduction process may be similar to the fuzzy matching sub-process of the entity augmentation process (see FIG. 5). For example, the fuzzy matching sub-process 600 may use cached blocks of entities to compare dataset records of existing entities. In one embodiment, block keys associated with existing entity record data 610 in the database 612 may be defined or generated 614 and saved 616 in a cache layer 618, which, in various embodiments, may comprise a memcache memory caching system, for example. The sub-process 600 may be applied to an existing entity or dataset record such that the entity or dataset record is compared against the other existing entities in the database 612. Thus, the system may read the existing dataset record data 620 to find 622, e.g., identify or compile, specified field data of the dataset record data. The system may then get one or more defined sets or combinations of blocks 624 stored in the cache layer 618 that match the identified dataset record data to narrow the population of comparisons. The dataset may then be compared to the existing entity records data using the fuzzy matching algorithm to execute matches within the one or more blocks 626 in a manner similar to the fuzzy matching algorithm described above for the fuzzy matching sub-process of the entity augmentation process. In one embodiment, the fuzzy matching algorithm comprises a decision tree using ranging from direct and fast string matching, intermediate steps for special processing such as, e.g., initials or abbreviations for identifier field data, such as first and middle names, and at the bottom of the decision tree, application of one or more string metrics.

According certain embodiments, the fuzzy matching algorithm comprises a hybrid algorithm for fuzzy string field matches including phonetic and character matching aspects. The fuzzy matching algorithm may include threshold determinations for matching and non-matching identifier fields and which may be associated with weighted fuzzy match scores for each identifier field. The weighted fuzzy match scores may then be used to calculate an overall fuzzy match score relating to the probability of a match between the two potential matched records. In some embodiments, the overall fuzzy match score may be used to output an outcome, e.g., match, no match, potential match, no decision. According to certain embodiments, following execution of matches within the blocks 626, the fuzzy matching sub-process 600 may attempt to address additional records 628, if needed 630, and repeat or stop 632 if additional processing is not required.

In certain embodiments, the fuzzy matching sub-process 600 further comprises a statistics cache generation process 634. According to various embodiments, the system may begin 636 the fuzzy-matching sub-process 600 by conducting one or more queries 638 of a source database 640, e.g., a database from which the new dataset or information regarding the dataset fields is sourced. For example, a statistics cache generation process 634 of a fuzzy matching sub-process 600 for dataset records comprising physician or provider related data fields may include importing query data from a source database 640 comprising, for example, the National Provider Identification (NPI) Registry database (but may use other source/reference databases) and caching the statistics 642 in the cache layer 618 for quick access in subsequent steps of the fuzzy matching sub-process, as described above. Thus, according to certain embodiments, various record or identifier instances may be compared through the fuzzy matching sub-process without repeating the statistics cache generation process 634 for each record or instance.

In one embodiment, a method for record linkage comprises performing an entity augmentation process for linking new data records with existing entities in a database. For example, in one embodiment performing the entity augmentation process comprises performing an exact matching sub-process comprising accessing existing entity UID keys in a memory cache layer and comparing a new data record UID key to the existing entity UID keys. In certain embodiments, performing the exact matching sub-process further comprises generating existing entity UID keys corresponding to defined exact match attributes for the existing entities in the database and caching the existing entity UID keys in the memory cache layer. In one embodiment, performing the exact matching sub-process may further comprise identifying an exact match attribute in the new data record to use as the new data record UID key and extracting the new data record UID key. In various embodiments, performing the exact matching sub-process may further comprise defining multiple exact match attributes and generating existing entity UID keys comprising the defined multiple exact match attributes of the existing entities. Exact match attributes may be identified in the new data record and the new data record UID key comprising one of the identified exact match attributes of the new data record may be extracted and compared to the existing entity UID keys in the caching layer comprising corresponding exact match attributes.

In certain embodiments, a method for record linkage comprises performing an entity augmentation process for linking new data records with existing entities in a database. For example, in one embodiment the method of performing the entity augmentation process further comprises performing a fuzzy matching sub-process if the exact matching sub-process does not return an exact match for the new data record. The fuzzy matching sub-process may comprises accessing existing entity block keys in a cache layer, wherein the existing entity block keys identify blocks of existing entities in the database sharing entity fields, and selecting one or more blocks for comparison to the new data record, wherein the one or more blocks selected are identified by block keys specifying entity fields matching corresponding fields of the new data record. According to a further embodiment of the method, performing the fuzzy matching sub-process may further comprises reading existing entity record data of the existing entities and generating the existing entity block keys to save in the cache layer. In one embodiment, the fuzzy matching sub-process further comprises executing the fuzzy matches algorithm and executing the fuzzy matches algorithm comprises comparing a plurality of corresponding identifier fields associated with the new record data and the one or more selected blocks. In one embodiment, the data structure for the block keys comprises a dictionary, wherein the key comprising the block key and the value comprises entity IDs sharing the block key. In one embodiment, the fuzzy matching algorithm comprises a decision tree for each of the plurality of identifier fields comprising direct matching and a hybrid phonetic and character matching algorithm for fuzzy string field matches of the plurality of identifier fields and executing the fuzzy matching algorithm further comprises accessing statistics and tables saved in the cache layer. In some embodiments, performing the fuzzy matching sub-process further comprises performing a statistic cache generation process comprising determining u-statistics and probabilities for use in a probabilistic record linkage process from statistics governing a source database and caching the u-statistics and probabilities in a cache layer.

In one embodiment, the method of record linkage includes an entity reduction process for matching dataset records within the database that describe the same entity. The entity reduction process may include a fuzzy matching sub-process comprising accessing entity block keys in a cache layer, wherein the entity block keys identify blocks of entities within the database sharing one or a set of specified field and selecting one or more blocks for comparison to a dataset record in the database, wherein the one or more blocks selected are identified by blocking keys specifying fields matching corresponding fields of the dataset record.

According to various embodiments, the system for performing record linkage comprises a database for storing a plurality of existing entity records and a data management processing system comprising a data import module configured to receive an imported data record. The data import module may comprise an entity augmentation process module process for linking new data records with existing entities in a database. The entity augmentation process module may be configured to perform an exact matching sub-process to, for example, access existing entity UID keys in a memory cache layer and compare a UID key associated with the imported data record to the existing entity UID keys. In one embodiment, the entity augmentation process module is further configured to generate existing entity UID keys for the existing entities in the database, wherein the existing entity UID keys correspond to exact match attributes defined in the system, and cache the existing entity UID keys in the memory cache layer. In one embodiment, the entity augmentation process module is configured to identify one or more exact match attributes in the imported data record. The entity augmentation process module may also be configured to perform the exact matching sub-process to identify an exact match attribute in the new data record to use as the imported data record UID key and extract the imported data record UID key. In one embodiment, the entity augmentation process module is further configured to perform a fuzzy matching sub-process to access existing entity block keys in a cache layer, wherein the existing entity block keys identify blocks of existing entities in the database sharing entity fields, and select one or more blocks for comparison to the imported data record, wherein the one or more blocks selected are identified by block keys specifying entity fields matching corresponding fields of the imported data record.

According to various embodiments, the system for performing record linkage comprises a database for storing a plurality of existing entity records and a data management processing system comprising a data import module configured to receive an imported data record. The data import module may comprise an entity augmentation process module process for linking new data records with existing entities in a database. According to one embodiment, the entity augmentation process module is configured to perform the fuzzy matching sub-process to read existing entity record data of existing entities in the database and generate the existing entity block keys from the existing entities in the database to save in a cache layer. In one embodiment, the entity augmentation process module performs the fuzzy matching sub-process only if the exact matching sub-process does not return an exact match for the imported data record.

According to various embodiments, the system for performing record linkage comprises a database for storing a plurality of existing entity records and a data management processing system comprising a data import module configured to receive an imported data record. The data management processing system may further comprises a data processing jobs module comprising an entity reduction process module for matching existing dataset records within the database that describe the same entity. In one embodiment, the entity reduction process module is configured to perform a fuzzy matching sub-process to access entity block keys in a cache layer, wherein the entity block keys identify blocks of entities within the database sharing one or a set of specified fields, and select one or more blocks for comparison to a dataset record in the database, wherein the one or more blocks selected are identified by blocking keys specifying fields matching corresponding fields of the dataset record.

In one embodiment, a method for record linkage comprises performing a fuzzy matching sub-process comprising accessing existing entity block keys in a cache layer. The existing entity block keys may identify blocks of existing entities in the database sharing entity fields. In one embodiment, the method further includes selecting one or more blocks for comparison to a dataset record, for example a new or existing dataset record. The one or more blocks selected may be identified by block keys specifying entity fields matching corresponding fields of the dataset record.

Figure 7:
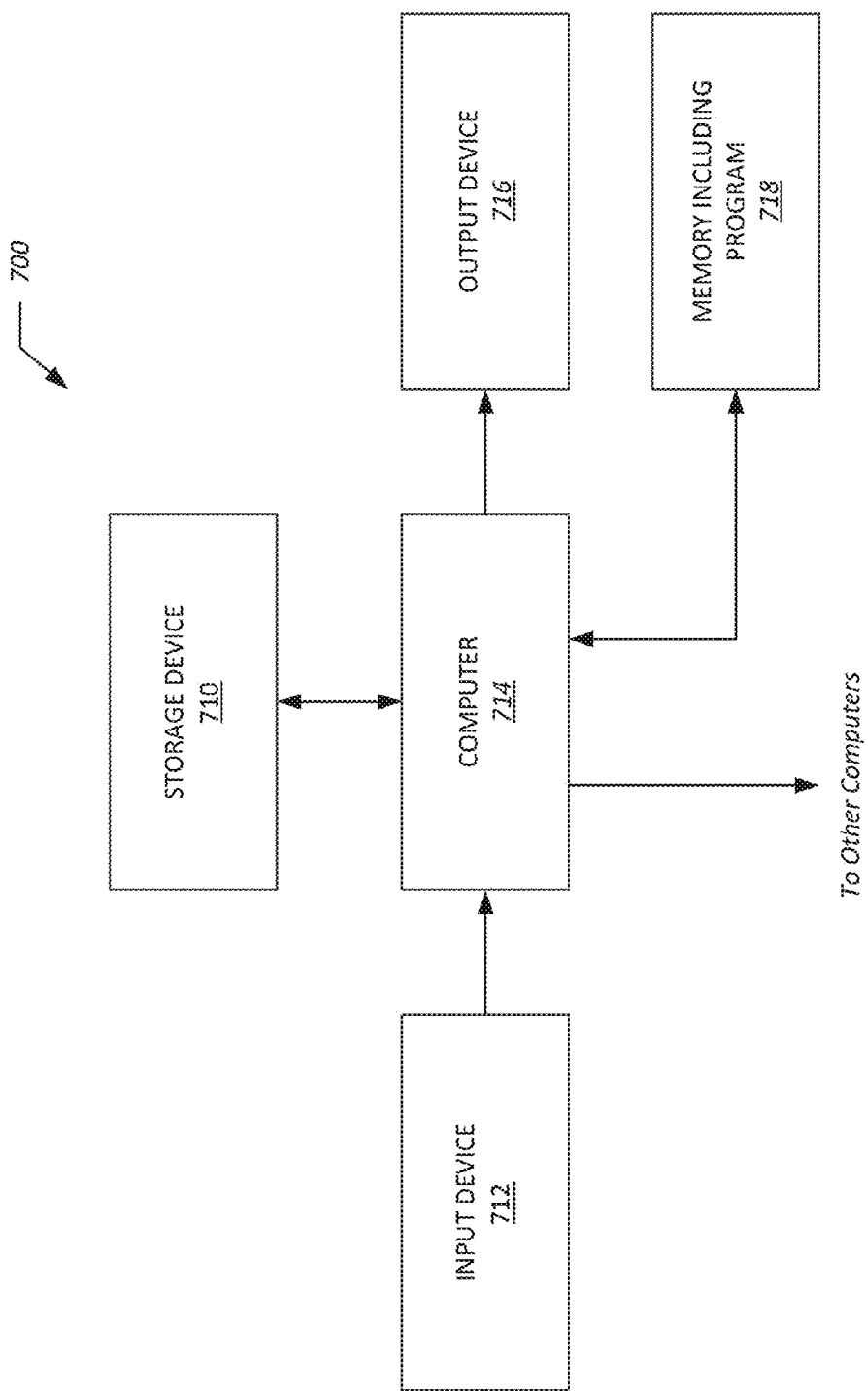
FIG. 7 illustrates a computer system for implementing a record linkage process according to various embodiments described herein.

FIG. 7 illustrates a computer system 700 for implementing a record linkage process. By way of the following prophetic teaching, there is provided computer support, as in a data processing system, for a record linkage process computer system. The computer support for the computer-implemented method of record linkage may be implemented by a computer system 700 as shown FIG. 7, or it may be implemented by multiple computers that may be connected or networked together in an ongoing manner, intermittently, or one time. In any case, control of such system can be enabled in accordance herein discussed below. The computer system 700 may include a computer 714, an input device 712 such as a keyboard, a storage device 710 such as a memory, a memory 718 including a program, such as a disk (note the storage 710 and memory 718 may or may not be the same device, depending on the implementation desired, in one embodiment the storage device 710 is a non-transitory storage device) including software, and an output device 716 such as a monitor screen, computer-to-computer communication device (e.g., modem), and/or a printer.

In one embodiment herein, a computer-readable media or memory 718 is provided, the computer-readable media or memory 718 tangibly embodying a program of instructions executable by the computer system to perform the steps of: performing an entity augmentation process for linking new data records with existing entities in database, which, in certain embodiments, may include performing an exact match sub-process comprising defining multiple exact match attributes, generating existing entity UID keys comprising the defined multiple exact match attributes of the existing entities, caching the existing entity UID keys in the memory cache layer, identifying an exact match attribute in the new data record to use as the new data record UID key, accessing existing entity unique identifier (UID) keys in a memory cache layer, extracting the new data record UID key, comparing a new data record UID key to the existing entity UID keys, and comparing the new data record UID key to the existing entity UID keys in the caching layer, which may comprise corresponding exact match attributes. Alternatively or in addition to the above, in one embodiment herein, a computer-readable media or memory 718 is provided, the computer-readable media or memory 718 tangibly embodying a program of instructions executable by the computer system to perform the steps of: performing an entity augmentation process for linking new data records with existing entities in database, which, in certain embodiments, may include performing a fuzzy matching sub-process comprising reading existing entity record data of the existing entities, generating existing entity block keys, wherein the existing entity block keys identify blocks of existing entities in the database sharing entity fields and the data structure for the block keys comprises a dictionary such that the key comprises the block key and the value comprises entity IDs sharing the block key, saving the existing entity block keys in a cache layer, accessing existing entity block keys in the cache layer, selecting one or more blocks for comparison to the new data record, wherein the one or more blocks selected are identified by block keys specifying entity fields matching corresponding fields of the new data record, wherein the fuzzy matching algorithm comprises a decision tree for each of the plurality of identifier fields comprising direct matching and a hybrid phonetic and character matching algorithm for fuzzy string field matches of the plurality of identifier fields, and wherein executing the fuzzy matching algorithm further comprises accessing statistics and tables saved in the cache layer, executing the fuzzy matches algorithm comprises comparing a plurality of corresponding identifier fields associated with the new record data and the one or more selected blocks, and performing a statistic cache generation process comprising determining u-statistics and probabilities for use in a probabilistic record linkage process from statistics governing a source database and caching the u-statistics and probabilities in a cache layer. Alternatively or in addition to the above, in one embodiment herein, a computer-readable media or memory 718 is provided, the computer-readable media or memory 718 tangibly embodying a program of instructions executable by the computer system to perform the steps of: performing an entity reduction process for matching dataset records within the database that describe the same entity, which, in certain embodiments, may include performing a fuzzy matching sub-process comprising reading existing entity record data of the existing entities, generating existing entity block keys, wherein the existing entity block keys identify blocks of existing entities in the database sharing entity fields and the data structure for the block keys comprises a dictionary such that the key comprises the block key and the value comprises entity IDs sharing the block key, saving the existing entity block keys in a cache layer, accessing existing entity block keys in the cache layer, selecting one or more blocks for comparison to a dataset record in the database, wherein the one or more blocks selected are identified by blocking keys specifying fields matching corresponding fields of the dataset record, wherein the fuzzy matching algorithm comprises a decision tree for each of the plurality of identifier fields comprising direct matching and a hybrid phonetic and character matching algorithm for fuzzy string field matches of the plurality of identifier fields, and wherein executing the fuzzy matching algorithm further comprises accessing statistics and tables saved in the cache layer, executing the fuzzy matches algorithm comprises comparing a plurality of corresponding identifier fields associated with the dataset record data and the one or more selected blocks, and performing a statistic cache generation process comprising determining u-statistics and probabilities for use in a probabilistic record linkage process from statistics governing the database and caching the u-statistics and probabilities in a cache layer. Indeed the program instructions can be such as to carry out any computer-assisted method or operation discussed herein.

In one embodiment, the computer support may include a process for controlling a computer system that implements the record linkage computer system. The system for controlling a computer system may include a switching system, which at a simplest level, can be menu displayed on a computer screen. The system for controlling may be structured to offer choices to solicit predetermined data or trigger predetermined operations, including, for example: entering data associated with the record linkage computer system.

In one embodiment, a plurality of computers can cooperate to implement the record linkage process. For example, each computer system can utilize a computer-to-computer communication device, and such as a network (e.g., telephone, Internet, cable, etc.) with electronic transmission means for (e.g., email, real time communication system, or the like), e.g., with a corresponding receiver system, in communicating between the computers to enable the computers to cooperate in carrying out the implementing of computer-implemented record linkage process.

For example, the plurality of computers may implement a computer-implemented system configured to execute a program of instructions executable by the computer system to perform an entity augmentation process for linking new data records with existing entities in database, which, in certain embodiments, may include performing an exact match sub-process comprising defining multiple exact match attributes, generating existing entity UID keys comprising the defined multiple exact match attributes of the existing entities, caching the existing entity UID keys in the memory cache layer, identifying an exact match attribute in the new data record to use as the new data record UID key, accessing existing entity unique identifier (UID) keys in a memory cache layer, extracting the new data record UID key, comparing a new data record UID key to the existing entity UID keys, and comparing the new data record UID key to the existing entity UID keys in the caching layer, which may comprise corresponding exact match attributes. Alternatively or in addition to the above, the plurality of computers may implement a computer-implemented system configured to execute a program of instructions executable by the computer system to perform an entity augmentation process for linking new data records with existing entities in database, which, in certain embodiments, may include performing a fuzzy matching sub-process comprising reading existing entity record data of the existing entities, generating existing entity block keys, wherein the existing entity block keys identify blocks of existing entities in the database sharing entity fields and the data structure for the block keys comprises a dictionary such that the key comprises the block key and the value comprises entity IDs sharing the block key, saving the existing entity block keys in a cache layer, accessing existing entity block keys in the cache layer, selecting one or more blocks for comparison to the new data record, wherein the one or more blocks selected are identified by block keys specifying entity fields matching corresponding fields of the new data record, wherein the fuzzy matching algorithm comprises a decision tree for each of the plurality of identifier fields comprising direct matching and a hybrid phonetic and character matching algorithm for fuzzy string field matches of the plurality of identifier fields, and wherein executing the fuzzy matching algorithm further comprises accessing statistics and tables saved in the cache layer, executing the fuzzy matches algorithm comprises comparing a plurality of corresponding identifier fields associated with the new record data and the one or more selected blocks, and performing a statistic cache generation process comprising determining u-statistics and probabilities for use in a probabilistic record linkage process from statistics governing a source database and caching the u-statistics and probabilities in a cache layer. Alternatively or in addition to the above, the plurality of computers may implement a computer-implemented system configured to execute a program of instructions executable by the computer system to perform an entity reduction process for matching dataset records within the database that describe the same entity, which, in certain embodiments, may include performing a fuzzy matching sub-process comprising reading existing entity record data of the existing entities, generating existing entity block keys, wherein the existing entity block keys identify blocks of existing entities in the database sharing entity fields and the data structure for the block keys comprises a dictionary such that the key comprises the block key and the value comprises entity IDs sharing the block key, saving the existing entity block keys in a cache layer, accessing existing entity block keys in the cache layer, selecting one or more blocks for comparison to a dataset record in the database, wherein the one or more blocks selected are identified by blocking keys specifying fields matching corresponding fields of the dataset record, wherein the fuzzy matching algorithm comprises a decision tree for each of the plurality of identifier fields comprising direct matching and a hybrid phonetic and character matching algorithm for fuzzy string field matches of the plurality of identifier fields, and wherein executing the fuzzy matching algorithm further comprises accessing statistics and tables saved in the cache layer, executing the fuzzy matches algorithm comprises comparing a plurality of corresponding identifier fields associated with the dataset record data and the one or more selected blocks, and performing a statistic cache generation process comprising determining u-statistics and probabilities for use in a probabilistic record linkage process from statistics governing the database and caching the u-statistics and probabilities in a cache layer.

If implemented by more than one computer, the computer system 700 may include a provider of goods or services to computer system such as records, data, memory, storage, peripherals, programs, operations, or the like. Any or all of the computer systems may include one or all of the following: an input device 712, such as a keyboard; a storage device 710; an output device 716; a memory 718, including a program, the foregoing articulated in greater exemplification with regard to FIG. 7, e.g., with the storage device 710 and memory 718 being separate or the same, as one may prefer in one implementation or another. For example, particular memory 718 aspects may be separate.

While various details have been set forth in the foregoing description, it will be appreciated that the various aspects of the record linkage process may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. For example, depending on the context, an entity attribute or record attribute may be used herein to refer to a general category or class of data that describes a type of information or data that may be associated with an entity or record, for example, the type of information or data that may populate a field, as well as the information, specific data, or a particular value that populates the field associated with an entity or record. Similarly, depending on the context, an identifier may refer to a general class or category of identifying data as well as specific identifying data of a particular entity or record.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for implementing computer-implemented record linkage process, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory, which may include one or more cache layers), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, source database, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A computer-implemented method for record linkage, the computer-implemented method comprising executing, by a processor, computer-executable instructions stored in a memory coupled to the processor, wherein the computer-executable instructions define an entity augmentation process for linking new data records with existing entities in a database, the entity augmentation process comprising:

performing an exact matching sub-process comprising:

staging, by the processor, a new data record, wherein staging the new data record comprises identifying one or more than one exact match attribute in the new data record and using the identified one or more than one exact match attribute as a new data record unique identifier (UID) key;

accessing, by the processor, one or more than one existing entity UID key stored in a memory cache layer of a non-transitory storage device, wherein the accessing comprises selecting at least one stored existing entity UID key of the one or more than one existing entity UID key, wherein the selected at least one stored existing entity UID key is associated with at least one or more than one exact match attribute that correspond to the identified one or more than one exact match attribute in the new data record;

comparing, by the processor, the new data record UID key to the selected at least one stored existing entity UID key; and determining, by the processor, that the new data record UID key and the selected at least one stored existing entity UID key comprise a match; and performing a fuzzy matching sub-process comprising:

accessing, by the processor, one or more than one existing entity block key stored in the memory cache layer, wherein each of the stored one or more than one existing entity block key identifies a subset of a total population of existing entities in the database, and wherein each of the stored one or more than one existing entity block key is associated with a particular set of entity fields;

identifying in the new data record, by the processor, new data record fields that correspond to at least one of the particular set of entity fields;

selecting, by the processor, at least one of the stored one or more than one existing entity block key such that the new data record will be compared to less than the total population of existing entities in the database, wherein the one or more particular set of entity fields associated with the selected at least one of the stored one or more than one existing entity block key correspond to the new data record fields, wherein the selected at least one of the stored one or more than one existing entity block key identify a selected subset of existing entities;

caching in the memory cache layer, by the processor, statistics for calculating an overall fuzzy match score, wherein the overall fuzzy match score is used to determine a match outcome for each comparison between each selected existing entity and the new data record;

comparing, by the processor, each identifier field of the new data record to each corresponding identifier field associated with each selected existing entity, wherein the comparing comprises performing a probabilistic linkage process based on the cached statistics to calculate a weighted fuzzy match score for each identifier field comparison; and calculating, by the processor, the overall fuzzy match score based on the weighted fuzzy match score calculated for each identifier field comparison.

2. The computer-implemented method for record linkage of claim 1, wherein performing the exact matching sub-process further comprises:

generating the one or more than one existing entity UID key, wherein the generating comprises:

defining one or more than one exact match attribute in the database;

iterating over the total population of existing entities in the database; and creating the one or more than one existing entity UID key, wherein each existing entity UID key is associated with the defined one or more than one exact match attribute; and
storing the one or more than one existing entity UID key in the memory cache layer.

3. The computer-implemented method for record linkage of claim 2, wherein performing the exact matching sub-process further comprises:
extracting the new data record UID key for comparison with the at least one stored existing entity UID key.

4. The computer-implemented method for record linkage of claim 1, wherein staging the new data record comprises identifying more than one exact match attribute in the new data record.

5. The computer-implemented method for record linkage of claim 1, wherein performing the fuzzy matching sub-process further comprises:
executing a fuzzy matching algorithm based on the cached statistics.

6. The computer-implemented method for record linkage of claim 5, wherein performing the fuzzy matching sub-process further comprises:
reading existing entity record data of the total population of existing entities in the database;
generating the one or more than one existing entity block key; and
storing the one or more than one existing entity block key in the memory cache layer.

7. The computer-implemented method for record linkage of claim 6, wherein a data structure of the stored one or more than one existing entity block key comprises a dictionary.

8. The computer-implemented method for record linkage of claim 5, wherein the fuzzy matching algorithm comprises a phonetic algorithm.

9. The computer-implemented method for record linkage of claim 1, wherein performing the probabilistic linkage process further comprises calculating a likelihood ratio between a m-probability value, denoting a probability of a positive or negative link between two compared identifier fields, and a u-probability value, denoting a probability that a match between two compared identifier fields is accidental, to assign a weight to each weighted fuzzy match score.

10. The computer-implemented method of for record linkage of claim 5, wherein the fuzzy matching algorithm comprises a sequence alignment algorithm.

11. The computer-implemented method for record linkage of claim 5, wherein the computer-executable instructions further define an entity reduction process.

12. A computer-implemented system for performing record linkage, the computer-implemented system comprising:
a processor;
a memory coupled to the processor, the memory configured to store computer-executable instructions;
a database for storing a plurality of existing entity records;
a data management processing system comprising a data import module configured to receive an imported new data record, wherein the data import module comprises an entity augmentation process module comprising computer-executable instructions that define an entity augmentation process for linking new data records with existing entities in a database, wherein the entity augmentation process comprises an exact matching sub-process and a fuzzy matching sub-process, wherein the computer-executable instructions are stored in the memory, and wherein executing the computer-executable instructions that define the exact matching sub-process causes the processor to:
stage a new data record, wherein the staging comprises identifying one or more than one exact match attribute in the new data record and using the identified one or more than one exact match attribute as a new data record unique identifier (UID) key;
access one or more than one existing entity UID key stored in a memory cache layer, wherein the accessing comprises selecting at least one stored existing entity UID key of the one or more than one existing entity UID key, wherein the selected at least one stored existing entity UID key is associated with at least one or more than one exact match attribute that correspond to the identified one or more than one exact match attribute in the new data record;
compare the new data record UID key to the selected at least one stored existing entity UID key; and
determine that the new data record UID key and the selected at least one stored existing entity UID key comprise a match; and
wherein further executing the computer-executable instructions that define the fuzzy matching sub-process causes the processor to:
access one or more than one existing entity block key stored in the memory cache layer, wherein each of the stored one or more than one existing entity block key identifies a subset of a total population of existing entities in the database, and wherein each of the stored one or more existing entity block key is associated with a particular set of entity fields;
identify in the new data record, new data record fields that correspond to at least one of the particular set of entity fields;
select at least one of the stored one or more than one existing entity block key such that the new data record will be compared to less than the total population of existing entities in the database, wherein the one or more particular set of entity fields associated with the selected at least one of the stored one or more than one existing entity block key corresponds to the new data record fields, wherein the selected at least one of the stored one or more than one existing entity block key identify a selected subset of existing entities;
cache in the memory cache layer, statistics for calculating an overall fuzzy match score, wherein the overall fuzzy match score is used to determine a match outcome for each comparison between each selected existing entity and the new data record;
compare each identifier field of the new data record to each corresponding identifier field associated with each selected existing entity, wherein the comparing comprises performing a probabilistic linkage process based on the cached statistics to calculate a weighted fuzzy match score for each identifier field comparison; and
calculate the overall fuzzy match score based on the weighted fuzzy match score calculated for each identifier field comparison.

13. The computer-implemented system of claim 12, wherein executing the computer-executable instructions that define the exact matching sub-process further causes the processor to:
generate the one or more than one existing entity UID key, wherein the generating comprises:
defining one or more than one exact match attribute in the database;

iterating over the total population of existing entities in the database; and creating the one or more than one existing entity UID key, wherein each existing entity UID key is associated with the defined one or more than one exact match attribute; and storing the one or more than one existing entity UID key in the memory cache layer.

14. The computer-implemented system of claim 12, wherein executing the computer-executable instructions that define the fuzzy matching sub-process further causes the processor to execute a fuzzy matching algorithm based on the cached statistics.

15. The computer-implemented system of claim 12, wherein executing the computer-executable instructions that define the fuzzy matching sub-process further causes the processor to calculate a likelihood ratio between a m-probability value and a u-probability value, to assign a weight to each weighted fuzzy match score.

16. The computer-implemented system of claim 15, wherein the m-probability value denotes a probability of a positive or negative link between two compared identifier fields and wherein the u-probability value denotes a probability that a match between two compared identifier fields is accidental.

17. The computer-implemented system of claim 14, wherein the fuzzy matching algorithm is a phonetic algorithm.

18. The computer-implemented system of claim 12, wherein the data management processing system further comprises a data processing jobs module comprising an entity reduction process module.

19. A computer-implemented method for record linkage, the computer-implemented method comprising executing, by a processor, computer-executable instructions stored in a memory coupled to the processor, wherein the computer-executable instructions define an entity augmentation process for linking new data records with existing entities in a database, the entity augmentation process comprising:

performing an exact matching sub-process comprising:

staging, by the processor, a new data record, wherein staging the new data record comprises identifying more than one exact match attribute in the new data record and using the identified more than one exact match attribute as a new data record unique identifier (UID) key;

accessing, by the processor, more than one existing entity UID key stored in a memory cache layer of a non-transitory storage device;

selecting, by the processor, an existing entity UID key of the more than one existing entity UID key stored in the memory cache layer;

comparing, by the processor, the new data record UID key to the selected existing entity UID key;

determining, by the processor, whether the new data record UID key and the selected existing entity UID key comprise a match; and upon determining that the new data record UID key does not match any of the stored more than one existing entity UID key, performing a fuzzy matching sub-process comprising:

accessing, by the processor, more than one existing entity block key stored in the memory cache layer, wherein each of the more than one existing entity block key identifies a subset of a total population of existing entities in the database, wherein each existing entity block key is associated with a particular set of entity fields; and selecting, by the processor, an existing entity block key of the more than one existing entity block key, wherein the particular set of entity fields corresponds to new data record fields of the new data record, wherein the selected existing entity block key identifies a subset of selected existing entities;

caching in the memory cache layer, by the processor, statistics for calculating an overall fuzzy match score, wherein the overall fuzzy match score is used to determine a match outcome for each comparison between each selected existing entity and the new data record;

comparing, by the processor, each identifier field of the new data record to each corresponding identifier field associated with each selected existing entity, wherein the comparing comprises performing a probabilistic linkage process based on the cached statistics to calculate a weighted fuzzy match score for each identifier field comparison; and calculating, by the processor, the overall fuzzy match score based on the weighted fuzzy match score calculated for each identifier field comparison.

20. The computer-implemented method for record linkage of claim 19, wherein performing the fuzzy matching sub-process further comprises executing a fuzzy matching algorithm based on the cached statistics.

* * * * *